US006990083B1

(12) United States Patent
Reina

(10) Patent No.: US 6,990,083 B1
(45) Date of Patent: Jan. 24, 2006

(54) METHOD AND DEVICE FOR COMPUTING ECHO-CANCELLATION COEFFICIENTS USING FFT

(75) Inventor: Guy Reina, Givatayim (IL)

(73) Assignee: Tioga Technologies, Ltd., Tel Aviv (IL)

( * ) Notice: Subject to any disclaimer, the term of this patent is extended or adjusted under 35 U.S.C. 154(b) by 501 days.

(21) Appl. No.: 09/698,539

(22) Filed: Oct. 27, 2000

(51) Int. Cl.
*H04B 3/20* (2006.01)

(52) U.S. Cl. ................. 370/286; 370/289; 379/406.01; 379/406.06

(58) Field of Classification Search ............... 370/210, 370/286, 289, 290; 379/406.01, 406.05, 379/406.06, 406.11
See application file for complete search history.

(56) References Cited

U.S. PATENT DOCUMENTS

| 4,074,086 | A | * | 2/1978 | Falconer et al. ........ 379/406.08 |
| 5,117,418 | A | * | 5/1992 | Chaffee et al. ............. 370/289 |
| 5,136,576 | A | * | 8/1992 | Brownlie .................... 370/286 |
| 5,917,809 | A |   | 6/1999 | Ribner et al. |
| 6,101,864 | A | * | 8/2000 | Abrams et al. .............. 73/1.01 |
| 6,252,902 | B1 | * | 6/2001 | Simeon et al. .............. 375/222 |
| 6,535,552 | B1 | * | 3/2003 | Pessoa ........................ 375/231 |

OTHER PUBLICATIONS

Echo Cancellation in Speech and Data Transmission, David G. Messerschmitt, IEEE J. Selcted Areas in Comm., vol. SAC-2, No. 2, Mar. 1984, pp. 283-297.

ANSI TI.413-1998—Network and Customer INstallation Interfaces—Asymmetric Digital Subscriber Line (ADSL) Metallic Interface, approved Nov. 11, 1998.

T1E1.4/91-157—A Multicarrier Primer, J. Cioffi, Amati Communication Corporation and Stanford University pp 1-18.

Discrete Multitone Echo Cancellation, M. Ho et al., IEEE Tran. Communications, vol. 44, No. 7, Jul. 1996, pp. 817-825.

Digital Signal Processing Schemes for Efficient Interpolation and Decimation, R.A. Valenzuela et al., IEEE Proceedings, vol. 130, No. 6, pp. 225-235, Dec. 1983.

* cited by examiner

*Primary Examiner*—Ajit Patel
*Assistant Examiner*—Steven A Blount
(74) *Attorney, Agent, or Firm*—Darby & Darby

(57) ABSTRACT

A method of calculating echo-canceling (EC) coefficients to be used by an echo cancellation filter in a communication modem, the communication modem having a Fast Fourier Transform (FFT) serial to parallel interface, the method including the steps of transmitting a first signal including a wide-band cyclic sequence, generating an echo signal based on the first signal and a plurality of EC coefficients, receiving a second signal including a wide-band cyclic sequence, subtracting the echo-canceled signal from the second signal to produce an echo-cancelled signal, transforming the echo-cancelled signal via the FFT serial to parallel interface to produce a transformed echo-cancelled signal, and calculating the plurality of EC coefficients based on the transformed echo-cancelled signal.

12 Claims, 3 Drawing Sheets

METHOD AND DEVICE FOR COMPUTING ECHO-CANCELLATION COEFFICIENTS USING FFT

FIELD OF THE INVENTION

The present invention relates generally to echo cancellation on transmission lines and, more particularly, to a method and a device for computing echo-cancellation coefficients for an echo cancellation filter.

BACKGROUND OF THE INVENTION

Echo cancellation (EC) is a well-known method for separation between received and transmitted signals in data transmission systems. For example, prior art echo-cancellation is described in "Echo Cancellation in Speech and Data Transmission", David G. Messerschmitt, IEEE J., Selected Areas in Comm., Vol. SAC-2, No. 2, March 1982, pp. 283–297, which is incorporated herein by reference. A basic echo cancellation system is illustrated schematically in FIG. 1.

The system shown in FIG. 1 typically includes a Finite Impulse Response (FIR) filter which estimates the level of leakage from the modem transmit path 6 to the modem receive path 8, and is adapted for use with a modem having a transmit path 6 and a receive path 8. An echo cancellation signal, y(n), is generated by an echo cancellation signal generator 10, based on EC coefficients, $C_i(n)$, calculated by a coefficient calculator 12. The echo cancellation filter coefficients, $C_i(n)$, provide an estimation of the leakage function. The output, y(n), of generator 10 is received by a substracter 14 which subtracts the echo cancellation signal from the received signal, yielding an echo canceled signal, e(n), also referred to herein as residual error signal. The echo canceled signal, e(n), is fed back to coefficient calculator 12, which calculates new echo cancellation coefficients based on the residual error signal. Thus, EC coefficients $C_i(n)$ are calculated iteratively using an adaptive process, e.g., a Linear Mean Square (LMS) algorithm, which may be executed by coefficient calculator 12. In case of a LMS adaptation algorithm, the following formula may be used:

$$C_i(n+1)=C_i(n)+\mu e(n)x(n-i) \quad (1)$$

wherein:

$C_i(n)$ is the i-th FIR coefficient at time n;

x(n) is the input to the filter at time n;

e(n) is the error at time n; and m is the adaptation constant (controls the rate of convergence)

Asymmetric Digital Subscriber Line (ADSL) modems are well known in the art. A basic structure of an ADSL modem is described, inter alia, in ANSI TI.413-1998—Network and Customer Installation Interfaces—Asymmetric Digital Subscriber Line (ADSL) Metallic Interface, and in T1E1.4/91-157—A multicarrier Primer, J. Cioffi, both of which are incorporated herein by reference.

Echo cancellation schemes for ADSL are described, inter alia, in Discrete Multitone Echo Cancellation, M. Ho et al., IEEE Tran. Communications, Vol. 44, No. 7, July 1996, pp. 817–825, and in U.S. Pat. No. 5,917,809, both of which are incorporated herein by reference. It should be noted that all the above mentioned schemes are based on stochastic iterative computation of the echo cancellation filter coefficients, using a residual error signal, e(n), and training sequence which is typically random, i.e., not cyclic.

FIG. 2 schematically illustrates a typical prior art echo cancellation scheme for an ADSL ATU-C modem. In this scheme, a signal generated by a constellation encoder 16 is transformed by an Inverse Fast Fourier Transform (IFFT) 18, e.g. an IFFT 512 (i.e, an IFFT having a block size of 512 samples), and transmitted via a parallel to serial (P/S) converter 20, at a rate of 2.208 Msps (Mega samples per second), to a digital to analog (D/A) converter 22, producing an analog transmitted signal 23. The signal from P/S converter 20 is decimated by a factor of 4, as indicated at block 30, and then transmitted to echo cancellation signal generator 10, which generates an echo cancellation signal as described above with reference to FIG. 1. At the receive path, an analog received signal 25 is converted by an analog to digital (A/D) converter 24 into a 552 Ksps (Kilo samples per second) digital signal. As described above with reference to FIG. 1, here too substracter 14 subtracts the echo cancellation signal, y(n), from the digital signal to yield an echo-canceled signal e(n), also referred to as "residual error signal" as described above. The echo-canceled signal is converted by a serial to parallel (S/P) converter 26 and transformed by a Fast Fourier Transform (FFT) 28, e.g., a FFT 128, to produce an output that may be fed to a frequency equalizer (not shown) followed by a constellation decoder (not shown) which reconstructs the transmitted data bits.

FIG. 3 schematically illustrates a typical prior art echo cancellation scheme for an ADSL ATU-R modem. In this scheme, a signal generated by a constellation encoder 116 is transformed by an IFFT 118, e.g. an IFFT 128, and transmitted via a parallel to serial (P/S) converter 120, at a rate of 552 Ksps, to a digital to analog (D/A) converter 122, producing an analog transmitted signal 123. The signal from P/S converter 120 is received by echo cancellation signal generator 10 which generates an echo cancellation signal, as described above with reference to FIG. 1. The echo cancellation signal, y(n), is interpolated by a factor of 4, as indicated at block 132, before being received by substracter 14. The interpolation process adds a sufficient amount of interpolated data to the echo cancellation signal, thereby to increase the transmission rate by a desired factor, e.g., by a factor of 4. Such an interpolation method is well known in the art and is described, for example, in "Digital Signal Processing Schemes for Efficient Interpolation and Decimation", R. A. Valenzuela, IEEE Proceedings, Vol. 130, No. 6, pp. 225–235, December 1983. At the receive path, an analog received signal 125 is converted by an analog to digital (A/D) converter 124 into a 2.208 Msps digital signal. Substracter 14 subtracts the interpolated echo cancellation signal from the digital signal to yield an echo-canceled (residual error) signal e(n). The echo-canceled signal is decimated by a factor of 4, as indicated at block 130, and the decimated signal is fed back to coefficient calculator 12. The echo-canceled signal is converted by a serial to parallel (S/P) converter 126 and then transformed by a Fast Fourier Transform (FFT) 128, e.g., a FFT 512.

SUMMARY OF THE INVENTION

The present invention is directed to a method and a device for calculating echo-canceling (EC) coefficients for an echo cancellation filter, for example, a Finite Impulse Response (FIR) filter, used in conjunction with a communication modem. The calculation of the EC coefficients in accordance with the present invention is based on the transmission of wide-band cyclic signals, such as those commonly used in ADSL startup sequences. The present invention obviates the need to use an iterative algorithm at a receiver end of the device. According to an embodiment of the present invention, the EC coefficients may be estimated either iteratively, using a Linear Mean Square (LMS) type algorithm, or they may be calculated directly from correlation sequences of the transmitted and echo signals. The use of symbolic cyclic signals in conjunction with FFT, according to an embodiment of the present invention, enables measurement of correlation sequences and calculation of EC coefficients from such sequences. The calculation of the EC coefficients in accordance with the present invention utilizes a Fast Fourier Transform (FFT) included in the receiver portion of the modem, e.g., the FFT commonly used in the receiver portion of an ADSL modem.

DETAILED DESCRIPTION OF THE INVENTION

The present invention utilizes transmission of cyclic signals and a non-iterative method for the estimation of Finite Impulse Response (FIR) filter coefficients for use in an echo canceller which is part of an Asymmetric Digital Subscriber Line (ADSL) modem.

In accordance with an embodiment of the present invention, the response of a given echo cancellation filter is calculated in the frequency domain based on frequency domain measurements of the echo cancellation (EC) path and the echo path. The echo path is the path going from an IFFT output to a digital-to-analog (D/A) converter and, then, through leakage to an analog-to-digital (A/D) converter and a FFT, as described in detail below with reference to the drawings. The calculated frequency response is consequently converted to the time domain of the FIR filter.

Figure 1:
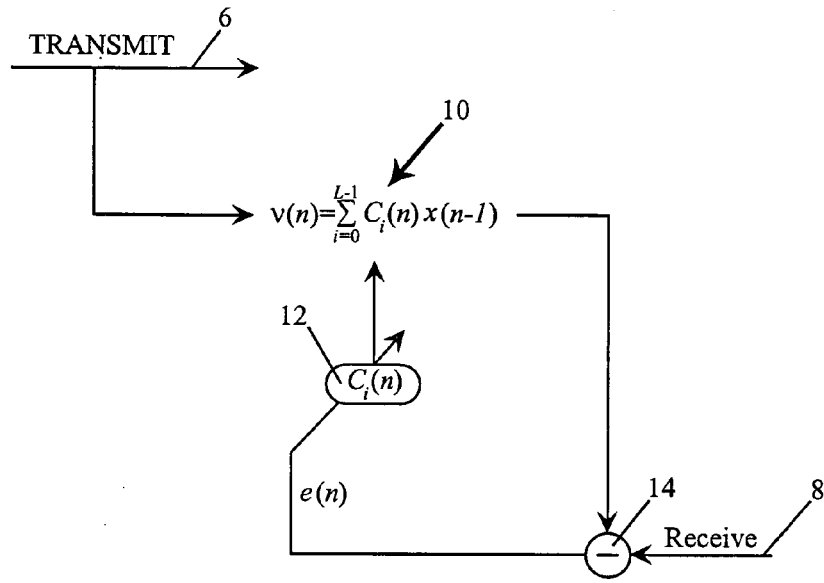
FIG. 1 is a schematic, block diagram, illustration of a basic prior art echo cancellation scheme.
Figure 2:
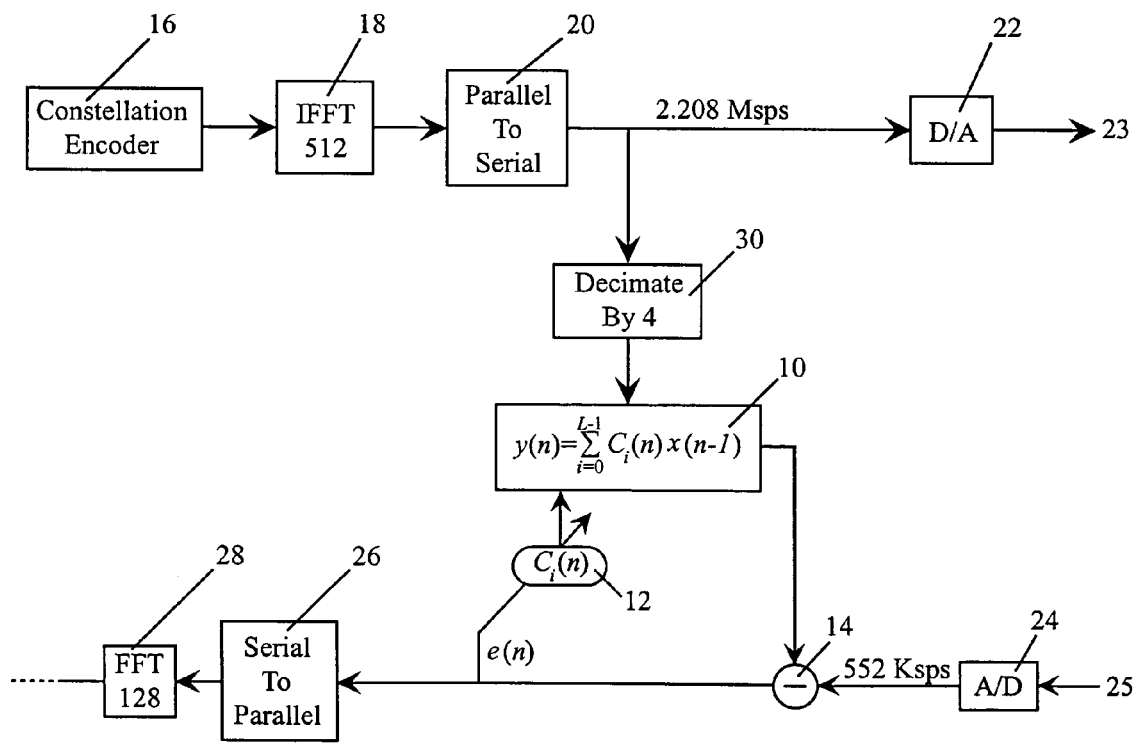
FIG. 2 is a schematic, block diagram, illustration of a prior art echo cancellation scheme for an Asymmetric Digital Subscriber Line (ADSL) ATU-C modem.
Figure 3:
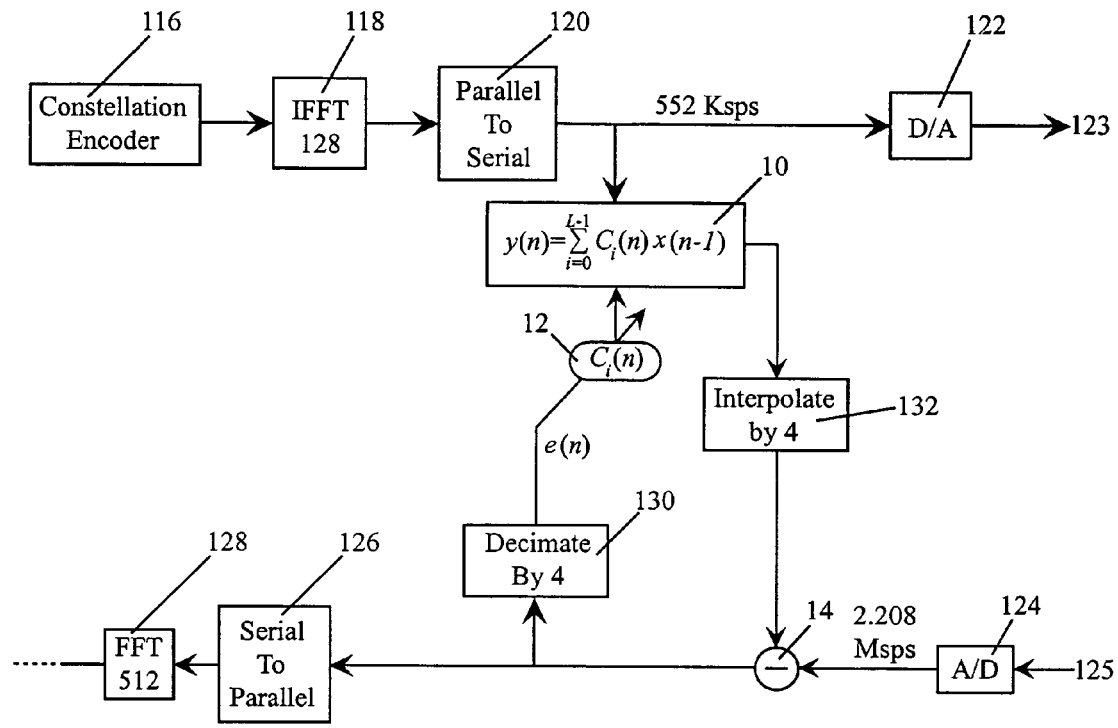
FIG. 3 is a schematic, block diagram, illustration of a prior art echo cancellation scheme for an ADSL ATU-R modem.
Figure 4:
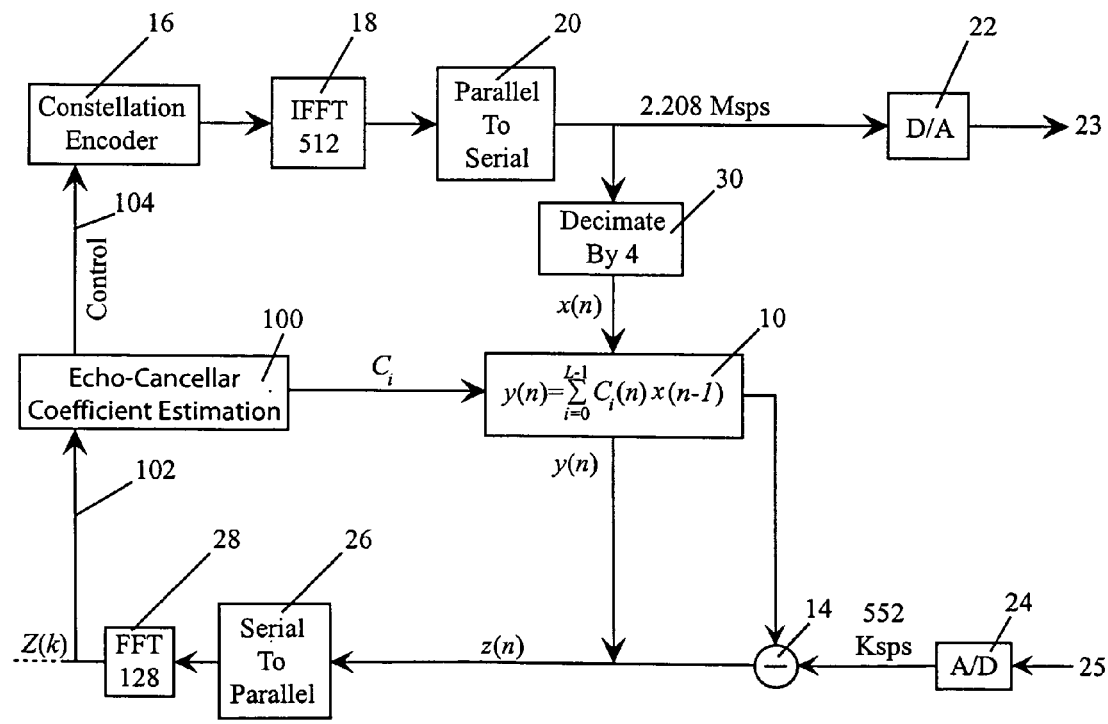
FIG. 4 is a schematic, block diagram, illustration of an echo cancellation scheme for an ADSL ATU-C modem in accordance with an embodiment of the present invention.
Figure 5:
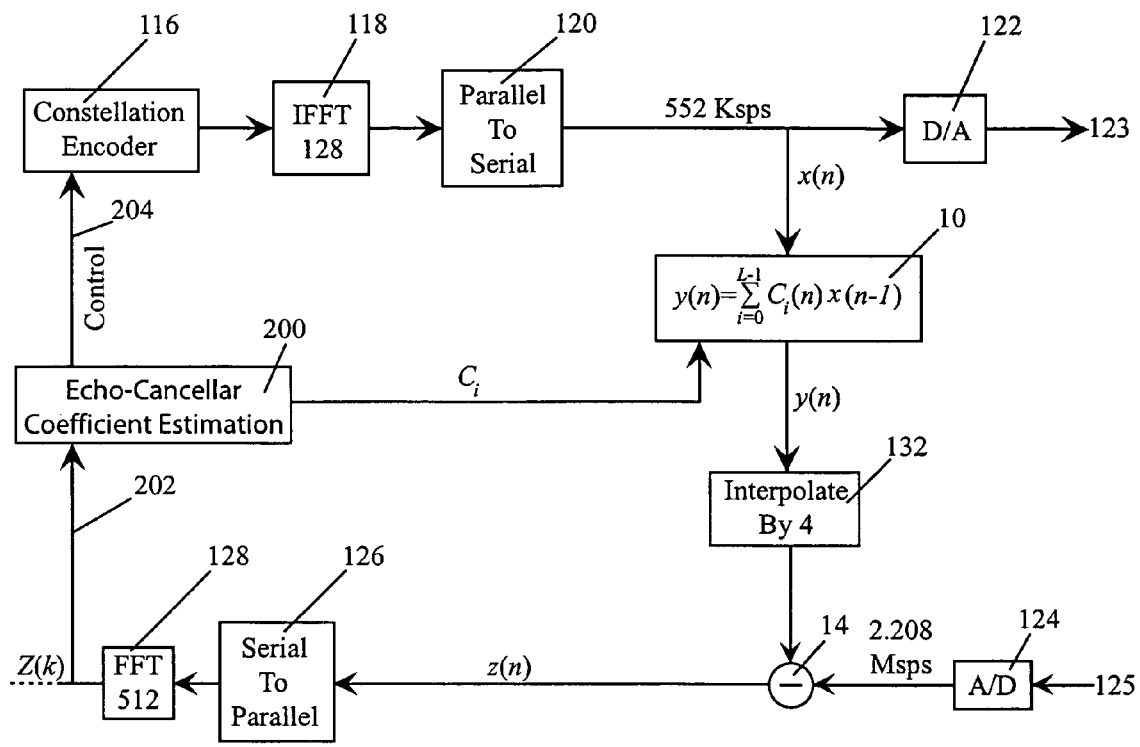
FIG. 5 is a schematic, block diagram, illustration of an echo cancellation scheme for an ADSL ATU-C modem in accordance with an embodiment of the present invention.

FIGS. 4 and 5 schematically illustrate schemes for calculating EC coefficients in accordance with two preferred embodiments of the present invention. The scheme shown in FIG. 4 is suitable for use in conjunction with an ADSL ATU-C modem. The scheme shown in FIG. 5 is suitable for use in conjunction with an ADSL ATU-R modem.

In the embodiment of FIG. 4, a signal generated by a constellation encoder 16 is transformed by an IFFT 18, e.g. an IFFT 512, and transmitted via a parallel to serial (P/S) converter 20, at a rate of 2.208 Msps, to a digital to analog (D/A) converter 22, producing an analog transmitted signal 23, as is known in the art. For some applications of the invention, the combination of constellation encoder 16, IFFT 18 and P/S converter 20 may be replaced by a look-up table which stores at least one cycle of the signal to be transmitted. When such a look-up table is used, the output signal may include a cyclic repetition of the look-up table.

The signal from P/S converter 20 is decimated by a factor of 4, as indicated at block 30, and provided as input $x(n)$ to an echo cancellation signal generator 10, which generates an echo cancellation signal, $y(n)$, received by a substracter 14. At the receive path, an analog received signal 25 is converted by an analog to digital (A/D) converter 24 into a 552 Ksps digital signal. Substracter 14 subtracts echo cancellation signal $y(n)$ from the digital signal, yielding an echo-canceled signal, $z(n)$. The echo-canceled signal $z(n)$ is then converted by a serial to parallel (S/P) converter 26 and transformed by a Fast Fourier Transform (FFT) 28, e.g., a FFT 128, yielding an integrated signal, $Z(k)$. As indicated by path 102, the integrated signal $Z(k)$ is also input to an echo-cancellation coefficient estimator 100 which calculates echo-canceling coefficients, $C_i$, to be used by echo-cancellation signal generator 10, as described in detail below. Coefficient estimator 100 also provides a control signal 104 to constellation encoder 16, as described below.

The control signal controls the timing of the transmitted signals, i.e., which signal would be transmitted at which time. The format of the control signal may vary and generally depend on specific implementations of the constellation encoder (CE). The control signal assists in the calculation of the EC coefficients by ensuring that channel response measurements are performed on designated transmitted signals. I some preferred embodiments it is sufficient to synchronize the cancellation coefficient calculator with the constellation encoder and, based on this synchronization, the coefficient calculator may determine the times at which the constellation encoder transmits appropriate reverb signals.

In the embodiment of FIG. 5, a signal generated by a constellation encoder 116 is transformed by an IFFT 118, e.g. an IFFT 128, and transmitted via a parallel to serial (P/S) converter 120, at a rate of 552 Ksps, to a digital to analog (D/A) converter 122, producing an analog transmitted signal 123, as is known in the art. The signal from P/S converter 120 is also supplied as input to echo cancellation signal generator 10 which generates echo cancellation signal $y(n)$. The echo cancellation signal is interpolated by a factor of 4, as indicated at block 132, and then received by substracter 14. At the receive path, an analog received signal 125 is converted by an analog to digital (A/D) converter 124 into a 2.208 Msps digital signal. Substracter 14 subtracts the interpolated echo cancellation signal from the digital signal, yielding echo-canceled signal $z(n)$. The echo-canceled signal $z(n)$ is converted by a serial to parallel (S/P) converter 126 and then transformed by a Fast Fourier Transform (FFT) 128, e.g., a FFT 512, yielding integrated signal $Z(k)$. As indicated by path 202, the integrated signal $Z(k)$ is supplied as input to an echo-cancellation coefficient estimator 200, analogous to estimator 100 of FIG. 4, which calculates the echo-canceling coefficients, $C_i$, to be used by echo-cancellation signal generator 10, as described in detail below. Coefficient estimator 200 also provides a control signal 204 to constellation encoder 116, as described below.

As explained above, with reference to FIG. 4, the control signal controls the timing of the transmitted signals, thereby to assists in calculating EC coefficients by ensuring that channel response measurements are performed on designated transmitted signals.

In an embodiment of the present invention, the echo-cancellation coefficient estimators, 100 or 200, perform the following functions:

1. Initializing the FFT and IFFT serial to parallel interfaces such that no cyclic prefix e.g., at a FFT/IFFT rate of 4.3125 Khz, is added or removed. This ensures that the channel response measurements are performed on a signal without a cyclic prefix. The addition of a cyclic prefix changes the symbol rate, e.g., from 4.3125 Khz to 4.0588 Khz; however the system described herein is based on an assumption that the bin spacing of the FFT is 4.3125 Khz, i.e., does not have a cyclic prefix.

2. Commanding constellation encoder, 16 or 116, respectively, to transmit a reverb signal without a cyclic prefix, to ensure that the channel response measurements are performed on a signal without a cyclic prefix, as explained above. The reverb signal may be as defined in ANSI TI.413-1998—Network and Customer Installation Interfaces—Asymmetric Digital Subscriber Line (ADSL) Metallic Interface, incorporated herein by reference in its entirety.

3. Disabling the Echo-Cancellation path. This function may be performed by setting all the filter coefficients, $C_i$, to zero.

4. Integrating the output of the FFT for L symbols to obtain an echo response measurement, Echo(k). The purpose of this integration is to reduce the effect of noise on the signal measurements (by "averaging out" noise) and, thus, to increase the signal-to-noise (S/N) ratio of the measurements. It is appreciated that a larger number of symbols, L, results in a higher S/N ration; however integration over a larger number of symbols also results in a longer execution time. The allowed execution time may also be constrained by the signal intervals in the ADSL start-up sequence. For example, values of L=16, L=32 and L=64 have been determined to provide a reasonable tradeoff between the S/N ration and the execution time in certain applications.

5. Enabling the echo-cancellation (EC) path with the filter coefficients, $C_i$, set to values which yield a unity gain filter.

6. Integrating the output, Z(k), of FFT 28 or 128, respectively, over L symbols, to obtain an Echo+EC response measurement.

7. Calculating an EC response, EC(k), by determining the difference between the Echo+EC response measurement and the echo response measurement (Echo(k)). Alternatively, by disabling the transmission path, the EC response (EC(k)) can be measured directly.

8. Based on the Echo+EC response and the echo response (Echo(k)) measurements, calculating the appropriate EC filter coefficients to be used by the echo-canceling signal generator 10, as described in detail below.

9. Setting the EC filter to operate with the EC coefficients calculated in the previous step.

All the above listed steps (1–9) may be performed by coefficients estimator 10. As explained above, in some implementations of the invention, the coefficient estimator may be synchronized with the signal generated by the constellation encoder (16 or 116) instead of separately controlling the constellation encoder (CE) and the P/S converter (20 or 120). For example, in the ADSL startup stage, the CE and P/S converter may be configured by a controller to transmit a sequence of signals as defined by the standard for the ADSL startup sequence. In such a scheme, coefficients estimator 10 may also be synchronized to the standard startup sequence and, thus, the measurements may be timed with the appropriate signals.

In a preferred embodiment of the present invention, the EC filter coefficients are calculated, using suitable hardware and/or software in coefficient estimators, 100 or 200, as described in detail below. The following notations are used throughout the description of the calculation process:

Echo(k)—the complex value of an echo path response measurement.

Ec(k)—the complex value of an EC path response measurement.

C(k)—the complex value of a desired echo cancellation response.

$\bar{c}$—the desired echo cancellation coefficients.

$\hat{c}(m)$—the selected echo cancellation coefficients.

w(m)—a windowing function, which may be used to "smooth the edges" of the filter response. It is noted that setting w(m)=1 for all m's yields the desired smoothing in most cases. Sharp drops in the signal at the response end of EC filter (i.e., in the time domain) may lead to a residual echo noise with a wide-band content. This spread of the noise over a relatively wide frequency band may degrade modem performance, because the modem operates more efficiently with lower frequency noise (i.e., frequencies below the operation band of the modem). This problem may be mitigated by "smoothing" the time domain response of the FIR near the edges of the transmitted frequency band, e.g., by applying to the FIR coefficients a windowing function with smooth transitions to zero near the edges.

k—the FFT bin index which represents a discrete equivalent of the FFT frequency. For a FFT of size M and sampling rate S the actual frequency may be derived from k using the formula f=k*S/M. For example, if the sampling rate is 2.208e6 Hz, the FFT size is 128, and k=10, then f= 2.208e6*10/128=43.125 KHz.

$\mathfrak{I}^{-1}\{\ \}$—an Inverse Fourier transform (e.g., IFFT)

L—a filter length, defined as the number of taps in the echo-cancellation FIR filter.

Using the above notations, the calculation in accordance with a preferred embodiment of the invention includes the following steps:

The desired echo cancellation response is calculated using the following formula:

$$C(k) = \frac{Echo(k)}{Ec(k)} \quad k = -63 \ldots 64 \qquad (2)$$

Then, the appropriate EC filter coefficients may be calculated based on the echo-cancellation response, using an inverse Fourier transform (e.g., an IFFT) as follows:

$$\bar{c} = \mathfrak{I}^{-1}\{C(k)\} \qquad (3)$$

As explained above, the channel response integration is performed in the frequency domain, i.e., after the FFT. However, the EC filter operates in the time domain. Therefore, an inverse FFT function is performed to transform the desired response from the time domain to the frequency domain.

The actual filter coefficients are then calculated using the following formula:

$$\hat{c}(m) = w(m) \cdot c(m) \quad m=0 \ldots (L-1) \qquad (4)$$

wherein w(m) is a temporal window designed to reduce the high frequency components of the filter coefficients, c(m).

It should be appreciated that generating a reverb signal is not fundamental to the EC filter coefficient calculation scheme of the present invention. The signal which is used may be generated either by the constellation Encoder (16 or 116) and IFFT (18 or 118) of FIGS. 4 and 5, respectively, or by a cyclic lookup table or by any other suitable methods known in the art. Further, it should be appreciated that the use of a specific type of reverb signal, as mentioned above with reference to the prior art, is not critical for the purposes of the present invention. In fact, any cyclic signal having non-zero components for all the frequencies utilized by the EC filter coefficient calculation process may be used instead of the above-mentioned reverb signal.

Integration of FFT output, $Z(k)$, may be performed either directly on the FFT output or using any linear (i.e., per bin) manipulation of the FFT output. For example, the output of a frequency equalizer (not shown) may be used as the basis for integrating $Z(k)$. In an alternative embodiment, the input received by the FFT (28 or 128) may be integrated in the time domain, and then the FFT transformation may be applied to the accumulated (integrated) vector to produce vectors $Echo(k)$ and $Ec(k)$.

In calculating filter coefficients, $C_i$, it is generally preferred to select from the measured response only bins corresponding to frequencies lower than or equal to the filter operation rate Nyquist frequency. In some embodiments of the invention, all the bins in this range are selected (e.g., $-63\ldots64$). Alternatively, any evenly spaced subset of this range may be selected, provided that such subset includes the DC bin and spans substantially the entire frequency range up to the Nyquist frequency. To fully represent the desired response, it is desired to include bins that span the entire frequency range, i.e., a range of zero to the Nyquist frequency in the sampled domain. The bin spacing defines the length of the desired response in the time domain. The larger the bin spacing, the shorter the response time. For a given EC FIR length L' (e.g. 32 taps), it may be a unnecessary to perform an IFFT that yields a desired response longer that L', because a desired response of such length would be truncated to length L'. For example, with an IFFT 128, a bin spacing of 1 in the frequency domain yields a desired response length of 128 in the time domain. If the filter response length is only 32, a bin spacing of 4 may be used and an IFFT32 may be applied instead of an IFFT128.

It should be appreciated that the present invention may be implemented by means of computer software or dedicated hardware or any combination of hardware and software as may be required for specific applications of the invention. For example, in a preferred embodiment of the invention, step 8 and 9 of the algorithm performed by echo-cancellation coefficient estimators, 100 or 200, as described above, may be executed using the following computer software code (written in C++):

```
Header Information
    #ifndef _CALCEC
    #define _CALCEC
    #include <Types.h>
    void    CalcEcCoeffs(CpxFixedVec16& EcResponse, CpxFixedVec16& TxResponse,
                                    int SymbolSize, float tx2ecfactor, int min ValidMeasure,
                                            _int32 *    ECCoefs, double * window =
    NULL, bool addToResponse = false);
    #endif
C++ Code
    #include <CalcEC.h>
    #include <stdlib.h>
    #include <fft\ifft_software.h>
    //////////////////////////////////////////////////////////////////////////
    // Function:
    //          CalcAndSetEcCoeffs
    //
    // General:
    //          calculate the EC coeffecints using the measured EC response and TX
    response
    //   and set the EC FIR coef. accordingly
    // Variables:
    //    EcResponse - measured EC path response
    // TxResponse - measured Tx Echo path response
    // SymbolSize - The symbol size to use with the channel response
    // tx2ecfactor - The gain factor between EcResponse to TxResponse
    // minValidMeasure - the minimal valid response measurment (smaller measurment are
    //       ignored (response set to zero)
    // ECCoefs - the EC filter coeffecint vector. (in/out)
    //       The vector as the following strueceture [Nb Na b0 b1 . . . OutputShift].
    //       When calling the function care should be taken to allocate memory
    //       for the array and set ECCoef[0] to the FIR order.
    //    window   - if this pointer points (not equal o NULL) to a window the coeffecint
    //       are multiplied by a window to smoothen the time domain response
    //                       edges.
    //       Default: NULL
    // addToResponse - if true the response is added to the the current coefs.
    //       if false (default) a totaly new coef. are calculated and loaded
    //////////////////////////////////////////////////////////////////////////
    void    CalcEcCoeffs(CpxFixedVec16& EcResponse, CpxFixedVec16& TxResponse,
                                            int SymbolSize, float tx2ecfactor, int
    minValidMeasure,
                                            _int32*    ECCoefs, double * window,
    bool addToResponse)
    {
        CpxFixedVec32       *    pDesiredResponse;   // The desired response
    (frequency domain)
```

```
        __int32              peakValue,           // The peak
    value of the array
                             rspShift,            // The shift
    applied to the desiredResponse
                                                  // to insure it
max value < 2^15    OutputShift,     // The output shift applied
        // to ensure maximal coef. bit usage
            FirOrder,            // The FIR filter order
    float       bitUsage,            // The bit usage of the array temp,
                tempImag,            // Temporary imaginary part
                tempReal,            // Temporary real part
                    *    fEcImpResponse, // The desired response (time
domain, floating                  // point)
                        FltToIntFactor;
    __int32          *    ImpResponse, // The impulse response (time
domain)
                    * RealChanResponse,        // The channel
response real part scaled
                                             // to fit the IFFT
                    * ImagChanResponse;        // The channel
response imag part scaled                    // to fit the IFFT
    FirOrder = ECCoefs[0]; // Extract the FIR order from the input vector
    // *** construct temporary buffers ***
    pDesiredResponse   = new CpxFixedVec32(SymbolSize/2);
    fEcImpResponse     = new float [SymbolSize];
    // IFFT input and output buffers
    ImpResponse        = new __int32[SymbolSize];
    RealChanResponse   = new __int32[SymbolSize/2];
    ImagChanResponse   = new __int32[SymbolSize/2];
    // set the DC tone value to zero
    (*pDesiredResponse)[0].SetReal(0);
    // calculate: desiredResopnse = TxResponse / EcResponse
    for (i=1; i<SymbolSize/2; i++)
    {
            if  (minValidMeasure    >
__max(abs(EcResponse[i].Real( )),abs(EcResponse[i].Imag( ))))
              { // if response measurements are invalid set desired response value to zero
                    (*pDesiredResponse)[i].SetReal(0);
                    (*pDesiredResponse)[i].SetImag(0);
              }
              else // response measurements are valid
              { // calculate the desired response
                    t   e   m   p                              =
(__int32)(EcResponse[i].Real( ))*(__int32)(EcResponse[i].Real( ));
                    t   e   m   p                              +  =
(__int32)(EcReponse[i].Imag( ))*(__int32)(EcResponse[i].Imag( ));
                    temp = (1 << 16) / temp;
                    tempReal  =  (float)   TxResponse[i].Real( )   *   (float)
EcResponse[i].Real( ) +
                                       (float)   TxResponse[i].Imag( )   *
(float)EcResponse[i].Imag( );
                    tempImag  =  (float)   TxResponse[i].Imag( )   *   (float)
EcResponse[i].Real( ) −
                                       (float)   TxResponse[i].Real( )   *
(float)EcResponse[i].Imag( );
                    (*pDesiredResponse)[i].SetReal(tempReal * temp);
                    (*pDesiredResponse)[i].SetImag(tempImag * temp);
              }
    }
    // Set the Nyquiest value of the response
(*pDesiredResponse)[0].SetImag((*pDesiredResponse)[SymbolSize/2−1].Real( )*2);
    // Fit the desired response into the IFFT data bits with 3db margin
    peakValue = 0;
    for (i=0; i<SymbolSize/2; i++)
              peakValue    =   __max(peakValue,
__max(abs((*pDesiredResponse)[i].Real( )),
abs((*pDesiredResponse)[i].Imag( ))));
    if (peakValue == 0)
              peakValue = 1;
    bitUsage = (log(peakValue)/log(2.0));
//  rspShift = ceil(bitUsage − (ATUC_FFT_DATA_RES − 2));
    rspShift = ceil(bitUsage − (32 − 2));
    if (rspShift>0)
              for (i=0; i<SymbolSize/2; i++)
              {
                    RealChanResponse[i]=(__int32)((*pDesiredResponse)[i].Real( ))
>> rspShift;
                    ImagChanResponse[i]=(__int32)((*pDesiredResponse)[i].Imag( ))
>> rspShift;
```

-continued

```
            }
    else
            for (i=0; i<SymbolSize/2; i++)
            {
                    RealChanResponse[i]=(__int32)((*pDesiredResponse)[i].Real( ))
<< (-rspShift);
                    ImagChanResponse[i]=(__int32)((*pDesiredResponse)[i].Imag( ))
<< (-rspShift);
            }
    // Transfer the channel response to time domain using the IFFT transform
    IFFT_fix (RealChanResponse,ImagChanResponse,ImpResponse,SymbolSize/2);
    // Calculate the impulse response taking into acount the
    // the different gains and shifts
    for (i=0; i<SymbolSize; i++)
            fEcImpResponse[i] = ImpResponse[i] * tx2ecfactor * pow(2.0,
rspShift-16);
    if (addToResponse)    // add coeffs to the old coeff
            OutputShift = ECCoefs[3 + FirOrder];
    else
    {
            // find the largest coef
            temp = 0;
            for (i=0; i <= FirOrder; i++)
                    if (temp < fabs(fEcImpResponse[i]))
                            temp = fabs(fEcImpResponse[i]);
            // calculate the extra shift so that largest coef will full in the
            // range 0.7 to 0.7/2
            OutputShift = __max(0,11 + floor(log(0.7 / temp)/log(2.0)));
    }
    // FltToIntFactor is the factor beetwen the floating point coefs. and the
    // integer coefs. FltToIntFactor = 1 << (MulShift + OutputShift + 16 bit to 20
    // bit shift)
    FltToIntFactor = pow(2,16 + OutputShift + 4);
    // *** Convert the coeffecints to there final integer form ***
    for (i=0; i <= FirOrder; i++)
    {
            if (window) // if a Window was supplied multiply the coefs. by window
            {
                    if (addToResponse)    // add coeffs to the old coeff
                            ECCoefs[i+2]    -=
floor(window[i]*FltToIntFactor*fEcImpResponse[i] + 0.5);
                    else                  // set a totaly new coeffs.
                            ECCoefs[i+2]    =    -
floor(window[i]*FltToIntFactor*fEcImpResponse[i] + 0.5);
            }
            else // else (window==NULL) use coeffecints as are
            {
                    if (addToResponse) // add coeffs to the old coeff.
                            ECCoefs[i+2]-=floor(FltToIntFactor*fEcImpResponse[i]
+ 0.5);
                    else                  // set a totaly new coeffs.
                            ECCoefs[i+2]=-floor(FltToIntFactor * fEcImpResponse[i]
+ 0.5);
            }
    }
    // Set the coeff of the EC and output shift
    ECCoefs[3 + FirOrder] = OutputShift; // set output shift
    // *** Destruct the temporary buffers ***
    delete          pDesiredResponse;
    delete[ ]       fEcImpResponse;
    delete[ ]       RealChanResponse;
    delete[ ]       ImagChanResponse;
    delete[ ]       ImpResponse;
}
```

The following window coefficients may be used in conjunction with the above code:

| | |
|---|---|
| 9.5491502812526274e−002 | 1.0000000000000000e+000 |
| 3.4549150281252627e−001 | 1.0000000000000000e+000 |
| 6.5450849718747373e−001 | 1.0000000000000000e+000 |
| 9.0450849718747373e−001 | 1.0000000000000000e+000 |
| 1.0000000000000000e+000 | 1.0000000000000000e+000 |

-continued

The following window coefficients may be used in conjunction with the above code:

| | |
|---|---|
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |

-continued

The following window coefficients may be used
in conjunction with the above code:

| | |
|---|---|
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 1.0000000000000000e+000 |
| 1.0000000000000000e+000 | 9.6984631039295421e−001 |
| 8.8302222155948895e−001 | 0.0000000000000000e+000 |
| 7.5000000000000000e−001 | 0.0000000000000000e+000 |
| 5.8682408883346526e−001 | 0.0000000000000000e+000 |
| 4.1317591116653485e−001 | 0.0000000000000000e+000 |
| 2.5000000000000011e−001 | 0.0000000000000000e+000 |
| 1.1697777844051105e−001 | 0.0000000000000000e+000 |
| 3.0153689607045842e−002 | 0.0000000000000000e+000 |
| 0.0000000000000000e+000 | 0.0000000000000000e+000 |
| 0.0000000000000000e+000 | 0.0000000000000000e+000 |
| 0.0000000000000000e+000 | 0.0000000000000000e+000 |
| 0.0000000000000000e+000 | 0.0000000000000000e+000 |
| 0.0000000000000000e+000 | 0.0000000000000000e+000 |
| 0.0000000000000000e+000 | |
| 0.0000000000000000e+000 | |

It will be appreciated by persons skilled in the art that the present invention is not limited by the preferred embodiments described above with reference to the accompanying drawings. Rather, the scope of the present invention is defined by the following claims:

What is claimed is:

1. A method of calculating echo-canceling (EC) coefficients to be used by an echo cancellation filter in a communication modem, the communication modem having a Fast Fourier Transform (FFT) serial to parallel interface, the method comprising the steps of:
    transmitting a first signal including a wide-band cyclic sequence;
    generating an echo signal based on said first signal and a plurality of EC coefficients;
    receiving a second signal including a wide-band cyclic sequence;
    subtracting the echo-canceled signal from said second signal to produce an echo-cancelled signal;
    transforming the echo-cancelled signal via said FFT serial to parallel interface to produce a transformed echo-cancelled signal;
    calculating said plurality of EC coefficients based on said transformed echo-cancelled signal; and
    providing at least one control signal to control the timing of said transmitting step so that said calculating step is performed for predesignated first signals.

2. A method according to claim 1, wherein said communication modem comprises an Inverse Fast Fourier Transform (IFFT) parallel to serial interface and wherein the step of transmitting said first signal comprises the step of transmitting said first signal via said IFFT parallel to serial interface.

3. A method according to claim 1, wherein said communication modem comprises an look-up table having stored therein at least one cycle of said first signal and wherein the step of transmitting said first signal comprises the step of transmitting a signal based on said look-up table.

4. A method according to claim 1 wherein said echo cancellation filter comprises a Finite Impulse Response (FIR) filter.

5. A method according to claim 1 wherein said wide-band cyclic sequence comprises an ADSL startup sequence.

6. A method according to claim 1 wherein calculating said EC coefficients comprises iteratively estimating said EC coefficients.

7. A method according to claim 1 wherein calculating said EC coefficients comprises calculating said EC coefficients directly from correlation sequences between said first signal and said echo signal.

8. A method according to claim 4 wherein the step of calculating said EC coefficients comprises the step of selecting L cross-correlation coefficients, $X(k)$, $k=0 \ldots (L-1)$, as filter coefficients $C(0)$ to $C(L-1)$, respectively, wherein L is the FIR filter length and $X(k)$ is a cross-correlation coefficient at time-distance, k.

9. A method according to claim 8 wherein the step of calculating said EC coefficients further comprises the step multiplying each selected filter coefficient $C(k)$ by a window coefficient, $w(k)$.

10. A method of calculating echo-canceling (EC) coefficients to be used by an echo cancellation filter in a communication modem, the communication modem having a Fast Fourier Transform (FFT) serial to parallel interface and an Inverse Fast Fourier Transform (IFFT) parallel to serial interface, the method comprising the steps of:
    transmitting, via said IFFT parallel to serial interface, a first signal including a wide-band cyclic sequence;
    generating an echo signal based on said first signal and a plurality of EC coefficients;
    receiving a second signal including a wide-band cyclic sequence;
    subtracting the echo-canceled signal from said second signal to produce an echo-cancelled signal;
    transforming the echo-cancelled signal via said FFT serial to parallel interface to produce a transformed echo-cancelled signal;
    initializing said FFT and IFFT interfaces such that no cyclic prefix is added to or removed from the first and second signals;
    commanding a constellation encoder of said modem to transmit a reverb signal without a cyclic prefix;

temporarily disabling the step of generating said echo signal;

integrating said second signal over a predetermined number, L, of symbols to obtain an echo response measurement, Echo(k);

reenabling the step of generating said echo signal with the EC coefficients set to values which yield a unity gain filter;

integrating the transformed echo-canceled signal over L symbols to produce an Echo+EC response measurement;

calculating an EC response, EC(k), by determining the difference between the Echo+EC response measurement and the echo response measurement (Echo(k)); and based on the Echo+EC response and the echo response (Echo(k)) measurements, calculating said EC coefficients.

11. A method according to claim 2 and further comprising:

initializing said FFT and IFFT interfaces such that no cyclic prefix is added to or removed from the first and second signals;

commanding a constellation encoder of said modem to transmit a reverb signal without a cyclic prefix;

temporarily disabling the step of generating said echo signal;

integrating said second signal over a predetermined number, L, of symbols to obtain an echo response measurement, Echo(k);

reenabling the step of generating said echo signal with the EC coefficients set to values which yield a unity gain filter;

integrating the transformed echo-canceled signal over L symbols to produce an Echo+EC response measurement;

calculating an EC response, EC(k), by determining the difference between the Echo+EC response measurement and the echo response measurement (Echo(k)); and based on the Echo+EC response and the echo response (Echo(k)) measurements, calculating said EC coefficients.

12. A method of calculating echo-canceling (EC) coefficients to be used by an echo cancellation filter in a communication modem, the communication modem having a Fast Fourier Transform (FFT) serial to parallel interface and an Inverse Fast Fourier Transform (IFFT) parallel to serial interface, the method comprising the steps of:

transmitting a first signal including a wide-band cyclic sequence, wherein the step of transmitting the first signal further comprises the step of transmitting said first signal via said IFFT parallel to serial interface;

generating an echo signal based on said first signal and a plurality of EC coefficients;

receiving a second signal including a wide-band cyclic sequence;

initializing said FFT and IFFT interfaces such that no cyclic prefix is added to or removed from the first and second signals;

commanding a constellation encoder of said modem to transmit a reverb signal without a cyclic prefix;

temporarily disabling the step of generating said echo signal;

integrating said second signal over a predetermined number, L, of symbols to obtain an echo response measurement, Echo(k);

reenabling the step of generating said echo signal with the EC coefficients set to values which yield a unity gain filter;

subtracting the echo-canceled signal from said second signal to produce an echo-cancelled signal;

transforming the echo-cancelled signal via said FFT serial to parallel interface to produce a transformed echo-cancelled signal;

integrating the transformed echo-canceled signal over L symbols to produce an Echo+EC response measurement;

calculating an EC response, EC(k), by determining the difference between the Echo+EC response measurement and the echo response measurement (Echo(k)); and based on the Echo+EC response and the echo response (Echo(k)) measurements, calculating said EC coefficients; and providing at least one control signal to control the timing of said transmitting step so that said calculating step is performed for predesignated first signals.

* * * * *